Sept. 8, 1942.
W. L. BENEDICT ET AL
2,295,197
CATALYTIC REFORMING OF HYDROCARBONS
Filed April 22, 1940
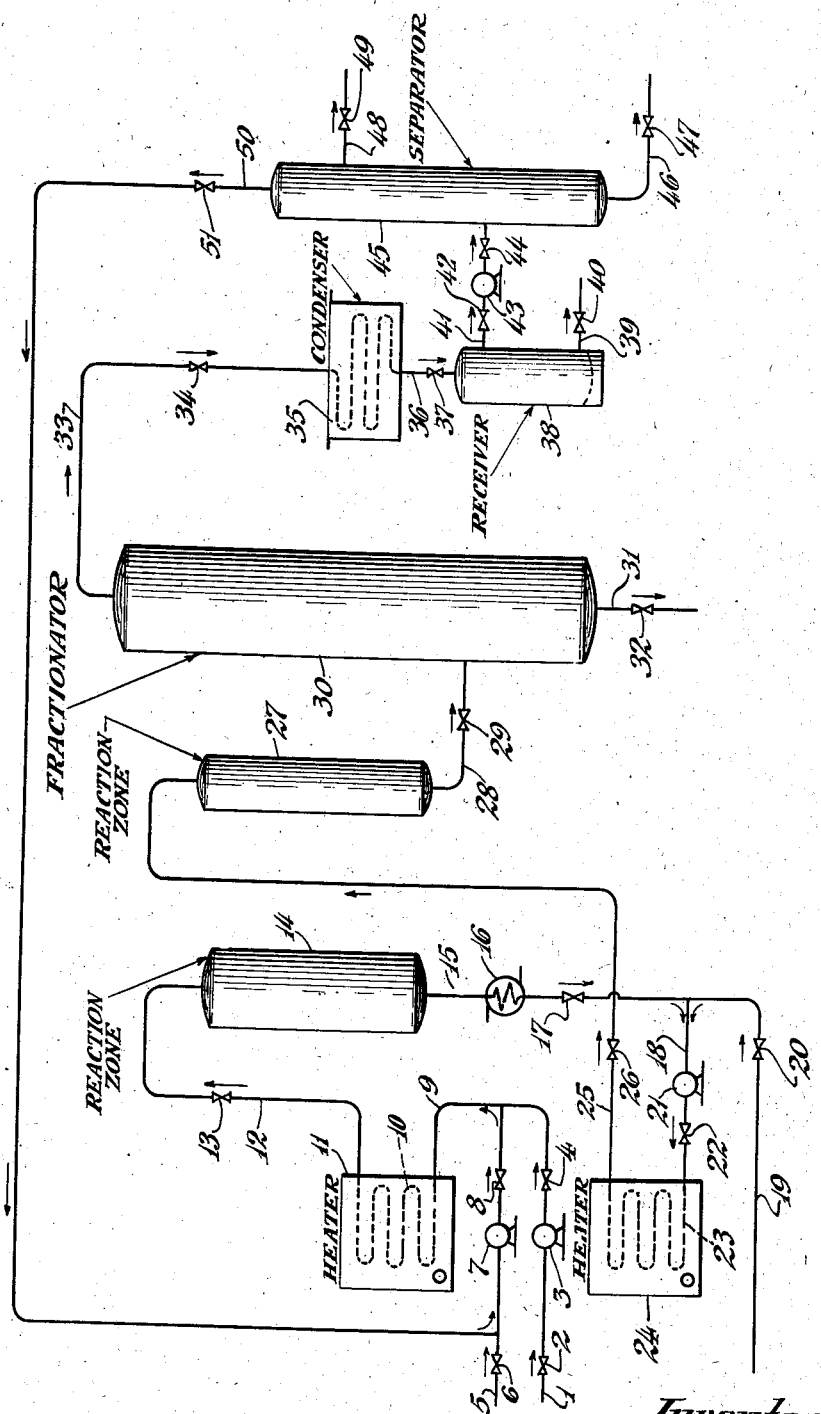
Inventors:
Wayne L. Benedict
William J. Mattox
By Lee J. Gary
Attorney.

Patented Sept. 8, 1942

2,295,197

UNITED STATES PATENT OFFICE 2,295,197

CATALYTIC RE-FORMING OF HYDROCARBONS

Wayne L. Benedict and William J. Mattox, Chicago, Ill., assignors to Universal Oil Products Company, Chicago, Ill., a corporation of Delaware Application April 22, 1940, Serial No. 330,955

4 Claims. (Cl. 196—52)

This invention relates to a process for improving the antiknock value of straight run and cracked hydrocarbon distillates boiling substantially within the motor fuel range to produce substantially olefin-free gasoline of high antiknock value and improved susceptibility to tetraethyl lead.

The reforming of straight run naphthas by non-catalytic methods has been carried out and various catalytic materials have been suggested to assist in improving the antiknock value thereof. In many instances these processes yield olefin-containing motor fuels which are of great utility in automobile engines but which because of the olefin content are undesirable as aviation fuels and which likewise have relatively low susceptibility to octane number increases by the addition thereto of tetraethyl lead.

In one specific embodiment the present invention is a process for improving the antiknock value of straight run and cracked distillates of motor fuel boiling range which comprises contacting a straight run naphtha in the presence of hydrogen with a catalytic agent in a primary reaction zone at a temperature within the range of approximately 500–650° C. and a pressure of substantially atmospheric to approximately 100 pounds per square inch, mixing the reaction products with cracked hydrocarbon distillate of motor fuel boiling range, contacting the mixture in a secondary reaction zone with a catalytic composite similar to that used in the primary reaction zone at a temperature of approximately 450–550° C. and a pressure of approximately 100–2000 pounds per square inch to produce a substantially olefin-free motor fuel of improved antiknock value, fractionating the reaction products, recovering the gasoline, recovering a hydrogen-containing fraction from the gaseous portion of said reaction products and returning a portion of said fraction to the primary reaction zone.

The catalytic agents useful in this process normally comprise relatively inert carriers such as activated alumina, titania, magnesia, thoria, silica, etc., having deposited thereon a relatively minor portion of a promoting oxide or sulfide of one or more elements appearing in the left-hand column of the 4th, 5th and 6th groups of the periodic table. Those compounds of chromium, molybdenum, vanadium, tungsten, uranium, etc. supported on alumina and referred to as alumina-chromia, alumina-molybdena, etc., are particularly effective and efficient composites. These catalysts may be prepared by impregnating the carrier with a solution of the compounds to be used, such as the nitrate followed by calcining the mixture at a temperature of approximately 500° C. or higher. In another variation, an acid such as chromic acid may be mixed with the carrier such as for example alumina, and the mixture heated to form the catalytic mass. Normally these materials are used in the form of granules or shaped forms such as pellets, spheres, etc., and the impregnated powder may be formed into such shapes prior to the calcination step.

In another variation a hydrate of the carrier such as aluminum hydrate, may be formed into shapes and these impregnated with a solution of the compound to be added, the mixture finally being calcined to produce a finished catalyst.

The catalyst may also comprise a mixture of the composites described with varying percentages of catalysts of the silica-alumina, silica-zirconia, silica-alumina-zirconia, etc., type. These in general are prepared by the separate or simultaneous precipitation of the components followed by appropriate washing, drying and calcining operations. Alkali metal ions are preferably removed substantially completely during the course of preparation.

It is within the scope of the invention to use catalysts of different composition in the various steps of the process. Thus, for example, a composite of the alumina-chromia, alumina-molybdena, etc., type may be used in the primary step for the initial treatment of the straight run naphtha or gasoline. In the second step, wherein the mixture of reaction products from the primary step with cracked gasoline is treated, the same or similar catalyst may be used, or a mixed composite such as that described in the foregoing paragraph may be used.

It should be understood that the various catalytic agents described are not necessarily exactly equivalent in their action or efficiency in promoting the desired reactions.

The invention may be better understood by reference to the accompanying drawing which is purely diagrammatic and illustrates one embodiment of the process, but which should not be construed as limiting it to the exact apparatus or conditions shown therein.

A straight run hydrocarbon oil such as naphtha boiling substantially within the gasoline range or slightly above the gasoline range, for example, a fraction having an end point of not more than approximately 245° C., is introduced through line 1, valve 2, pump 3 and valve 4. It is mixed with hydrogen or a hydrogen-containing gas from line 5, valve 6, pump 7 and valve 8, and the mixture passes through line 9 to coil 10 which is disposed in heater 11. Here it is heated to a temperature within the range of approximately 500–650° C. The reaction products pass through line 12 and valve 13 to reaction zone 14 wherein the catalyst is disposed. The reactors used may comprise tubes disposed in a heating zone or various types of chambers suitable for carrying out catalytic reactions. The temperature maintained herein is of the order of 500–650° C. and a pressure substantially atmospheric or slightly superatmospheric, say of the order of 50–100 pounds per square inch. When operating under the conditions described using catalysts of the character described, the gaseous hydrogen content of the gas fraction of the reaction products from the primary reaction zone is substantially increased.

The reaction products pass through line 15, cooler 16, valve 17 to line 18 wherein they mingle with cracked gasoline entering from line 19 and valve 20. The mixture is pumped by pump 21 through valve 22 to coil 23 which is disposed in heater 24. Here the temperature is increased and the mixture is passed through line 25 and valve 26 to reaction zone 27 wherein a temperature of approximately 450–550° C. and a pressure of approximately 100–2000 pounds per square inch or higher is maintained. The catalytic agent used at this point may be of the same class as that used in reaction zone 14 but need not be identical with it. The reaction products pass through line 28 and valve 29 to fractionator 30. A residual oil boiling above the gasoline range, of which a small quantity may be formed, is withdrawn through line 31 and valve 32. Gasoline and gas pass through line 33 and valve 34 to condenser 35 and thence through line 36 and valve 37 to receiver 38. The gasoline may be withdrawn through line 39 and valve 40. The gasoline is substantially olefin-free and of low sulfur content and may be used as an aviation fuel or for high antiknock motor fuel wherein a high degree of susceptibility to tetraethyl lead is desired. The gaseous reaction products together with hydrogen are passed through line 41 and valve 42, pump 43 and valve 44 to separator 45 which is represented as a single vessel, but which may comprise the usual absorption and gas separation equipment wherein gaseous hydrocarbons may be separated. Any liquid hydrocarbons may be removed through line 46 and valve 47 and blended with the finished gasoline, and a part of the gaseous hydrocarbons such as butane, propane, etc., are withdrawn through line 48 and valve 49. The hydrogen or hydrogen and low boiling hydrocarbons such as methane, ethane, etc., which is recovered is removed through line 50 and valve 51, joining with line 50 and thus being returned to the reforming system.

The catalytic agents employed in both reaction zones may gradually accumulate carbonaceous or hydrocarbonaceous deposits which mask the catalytic activity of the composites and necessitate intermittent reactivation. This is usually accomplished by treatment with an oxygen containing gas at a temperature in the range of approximately 450–700° C. which may or may not be followed by a brief treatment with hydrogen prior to resuming processing. The intervals of reactivation vary widely with the conditions and catalysts used and may be from the order of an hour or so to a matter of several hours or even days. Furthermore, the time between reactivations may be different in the different zones. To make the reactivation more convenient the reactors in each zone are usually supplied in duplicate, one being used in the process cycle while the other is being reactivated. It is, of course, possible to interrupt the processing period at intervals to accomplish the revivification. Although the lines and equipment for reactivation are not shown in the drawing (the omission was made for purposes of simplifying the drawing), it is understood that such may be needed in commercial operation of the process.

It is an advantage of the present process that reforming is accomplished substantially without consumption of hydrogen which is a costly item in many processes wherein cracked gasolines are converted to olefin-free fuels. Moreover, the hydrogen acts to prevent undue loss of catalytic activity and prevents carbon formation to a large extent. This results in an overall saving in operating costs and a reduction in material losses. Furthermore, the overall antiknock properties of the final treated gasoline are greatly improved by the present operation.

The following example is given to illustrate the usefulness and practicability of the process but should not be construed as limiting it to the exact conditions or catalysts used therein.

A Mid-Continent naphtha having an octane number of approximately 33 and a boiling range of approximately 90–210° C. is mixed with approximately 43,000 cubic feet of hydrogen per barrel of naphtha and passed over a catalyst consisting of approximately 88% alumina and 8% chromia at a temperature of 550° C. and a pressure substantially atmospheric. The reaction products are cooled and mixed with a Mid-Continent cracked gasoline having a 210° C. end point, in a ratio of approximately 36 gallons of cracked gasoline per 42 gallon barrel of the original naphtha charged. The cracked gasoline had an octane number of 80. The total product recovered may amount to 88 volume per cent of the original charge having an octane number of 78, a bromine number of 7, water-white color and a sulfur content of 0.01%. The hydrogen recovered amounts to 43,100 cubic feet and this may be recycled to the first step.

The gasoline recovered is suitable for use in aviation blends, or could be used as a high antiknock motor fuel directly, or could be blended with other fuels whereby the susceptibility to tetraethyl lead may be increased. The octane number of the fuel with 3 cc. of tetraethyl lead is 89.

We claim as our invention:
1. A process for reforming hydrocarbon oil of substantially gasoline boiling range which comprises mixing a straight run oil with hydrogen, subjecting the mixture to catalytic reforming agent at a temperature within the range of 500–650° C. and a pressure within the range of substantially atmospheric to 100 pounds per square inch, mixing resultant reaction products, including hydrogen, with a cracked hydrocarbon distillate of substantially gasoline boiling range, subjecting the resultant mixture to catalytic reforming at a temperature within the range of approximately 450–550° C. and a pressure within the range of approximately 100–2000 pounds per square inch, fractionating resultant reaction products into gas and gasoline, recovering the gasoline, separating a hydrogen-containing fraction from the gases and returning and mixing said fraction with said straight run oil.

2. A process for reforming hydrocarbon oil of substantially gasoline boiling range which comprises mixing a straight run naphtha with a hydrogen-containing gas, contacting the mixture with a catalytic composite consisting of a relatively inert carrier having deposited thereon a minor portion of an oxide of an element selected from the group consisting of an element appearing in the left-hand column of the 4th, 5th and 6th groups of the periodic table, at a temperature within the range of approximately 500–650° C. and a pressure within the range of approximately atmospheric to 100 pounds per square inch, mixing the reaction products with a cracked hydrocarbon distillate of substantially gasoline boiling range, and contacting the mixture with a catalyst of the character hereinbefore described at a temperature within the range of approximately 450–550° C. and a pressure within the range of approximately 100–2000 pounds per square inch.

3. A process for producing anti-knock gasoline of relatively low olefin content which comprises catalytically reforming straight run petroleum distillate containing gasoline fractions in the presence of a hydrogen-containing gas at a temperature in the approximate range of 500–650° C., thereby forming a reaction product containing a gaseous fraction of increased hydrogen content, commingling cracked gasoline with said product and subjecting the resultant mixture to catalytic reforming at a temperature in the approximate range of 450–550° C. and under superatmospheric pressure.

4. A process for producing anti-knock gasoline of relatively low olefin content which comprises catalytically reforming straight run petroleum distillate containing gasoline fractions in the presence of a hydrogen-containing gas at a temperature in the approximate range of 500–650° C., thereby forming a reaction product containing a gaseous fraction of increased hydrogen content, commingling cracked gasoline with said product and subjecting the resultant mixture to catalytic reforming at a temperature in the approximate range of 450–550° C. and under superatmospheric pressure in the approximate range of 100–2000 lbs. per square inch.

WAYNE L. BENEDICT.
WILLIAM J. MATTOX.